United States Patent Office 3,176,350
Patented Apr. 6, 1965

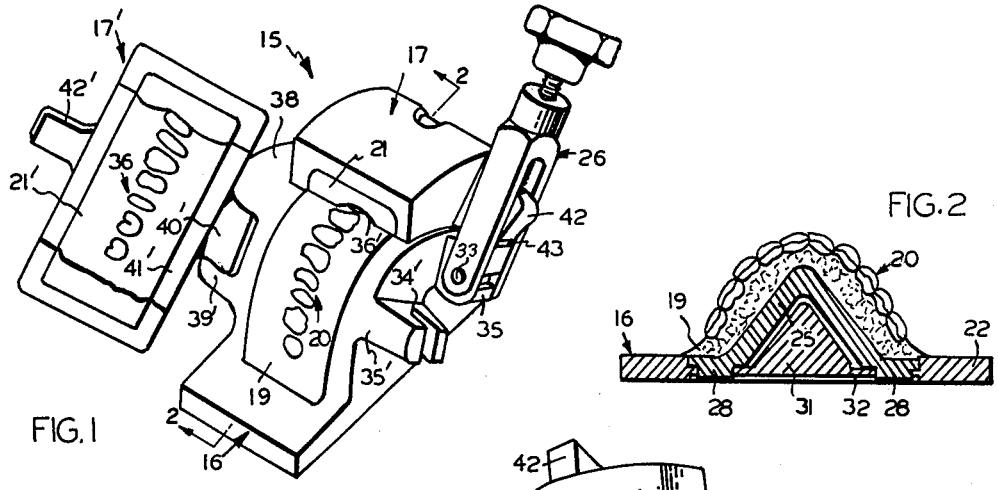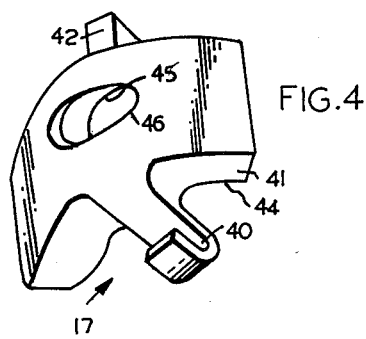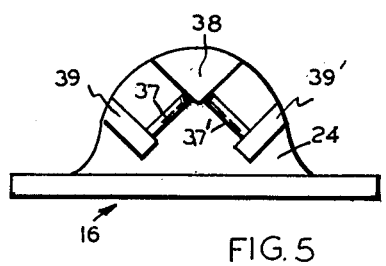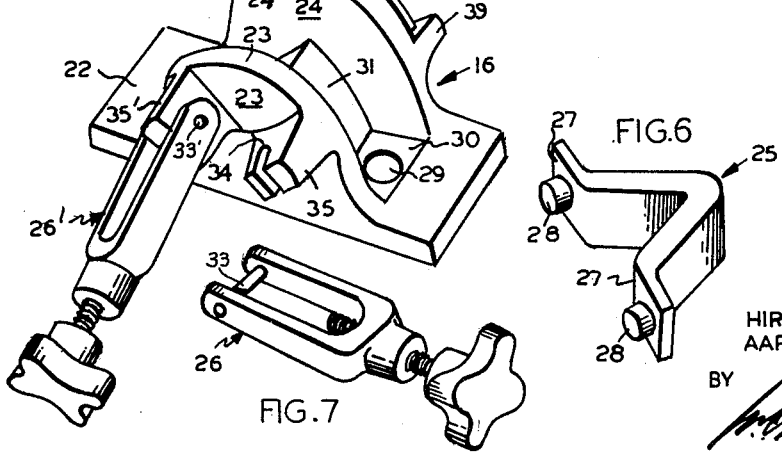

3,176,350
DENTAL FLASKS
Aaron Ryen and Hirsh E. Ryen, both of 276 Nancy Drive,
East Meadow, N.Y.
Filed Nov. 6, 1962, Ser. No. 235,797
13 Claims. (Cl. 18—33)

This application is a continuation-in-part of our application filed on September 21, 1961, under Serial No. 140,188 and now abandoned.

The present invention relates to dental flasks for forming extensive units of plastic bridgework.

An object of this invention is to provide a novel and improved molding flask to encase and support dental bridgework or framework so as to prevent distortion during the processing and particularly to improve the blending of incisal and body colors by avoiding the backing up of the incisal blending plastic onto the body shade.

Another object thereof is to provide a dental molding flask of the character described which can be manipulated to expose only part of the investment so that a mechanic can do necessary work thereon without disturbing the remainder. Such provision allows the flask to accommodate two separate segments of an arch, either of which may be exposed for work to be done thereon without disturbing the other.

A further object of this invention is to provide a dental flask of the kind set forth, of novel and improved construction, having the mentioned attributes and which is simple and easy to use, reasonable in cost to manufacture, avoids spoilage of the tooth shade, and which is efficient in carrying out the purposes for which it is designed.

Other objects and advantages will become apparent as this disclosure proceeds.

For the practice of this invention, one form the dental flask may assume, is to have a lower mold section having two opposite upright walls between which fits an upright arch extending along them. There are two separate upper mold sections, pivoted to one of said walls for independent swinging movement to and away from the second wall. It is to be especially noted that the manner of movement given to the upper molds by this construction, causes excess blending material to be forced off the incisal edges of the facings rather than allowing it to spread and back up onto the body shades. Means are provided to forcibly clamp the upper molds to the lower mold section. In the preferred embodiment illustrated herein, the arch, the upper molds and their individual clamps are independently separable from the lower mold section with provision for their easy disassembly and thereafter their assembly. One of the upper flask members is right and the other is left, so as not to be interchanged.

Other incidents of structure, a more detailed description of a preferred embodiment of this invention and an explanation of the manners of its use and its operation, will now be given, for which reference is had to the accompanying drawing forming part of this specification. In such drawing, similar characters of reference indicate corresponding parts in all the views.

FIG. 1 is a perspective view of a dental flask embodying the teachings of this invention. It is shown in use, with the left upper mold swung upward to expose part of the work, after removal of its clamp.

FIG. 2 is a section taken at line 2—2 in FIG. 1, showing only the lower flask member, its associated arch and the work they hold.

FIG. 3 is a perspective view of the lower flask member in association only with the left upper mold which is swung upward and the clamp for such upper mold, in inoperative position.

FIG. 4 is a perspective view of the right upper mold.

FIG. 5 is a rear view of the lower flask member.

FIG. 6 is a perspective view of the removable arch.

FIG. 7 is a perspective view of the clamp for the right upper mold. In fact, both clamps are identical.

In the drawing, the numeral 15 designates generally a dental flask which essentially is composed of a lower mold section indicated generally by the numeral 16, a right upper mold section and a left upper mold section, denoted generally by the numerals 17 and 17' respectively. Within said lower mold section 16, there is to be artificial stone 19 in which bridgework 20 is to be invested so as to be visible from end to end; such bridgework preferably consisting of crowns and dummies made of precious metal and soldered together in bridge form, over which wax facings have been contoured. The upper mold sections 17, 17', which may be called counter molds, are inverted channels to hold artificial stone masses as indicated at 21, 21' respectively, in each of which an impression is to be taken of one half of the bridgework.

Said lower mold section comprises a base 22 having the opposite, upright front and rear walls 23 and 24 respectively. This offers an upright channel for the artificial stone 19. In order to facilitate the placing of the bridgework 20 into the lower mold section 16 and to minimize the mass of the artificial stone 19 to hold said bridgework therein, an upright arch 25 of a size somewhat smaller than the smallest arch of the human mouth, is on the base 22, fitted between said walls 23, 24 and extends therealong below said walls. When the flask 15 is closed, one half of said arch 25 is below each of the counter molds 17, 17' respectively. Both counter molds are hingedly mounted to the rear wall 24 of the lower mold section, for downward swinging movement to and upward swinging movement from the front wall 23. There are clamps 26, 26', one for association with each of the counter molds respectively to hold them fast to the lower mold section 16.

It is to be noted that each of the counter molds is independently swingable, so that either may be in raised position as 17 is in FIG. 1, or in lowered position and clamped as 17' is in said FIG. 1. This arrangement makes possible that the flask 15 be utilized for two separate segments of bridgework, each segment accommodated by a countermold respectively, thereby permitting a mechanic to expose either bridge segment for necessary work while keeping the other segment undisturbed and clamped in the flask.

It is preferred that the arch 25 shall be liftable out of the lower mold section 16, with the finished work, and so said arch is made a separate member with base pieces 27 at its distal ends, each having a downward pin 28 which fits into a hole as 29 in the base 22. Those portions of floor surface as 30 on which said base pieces respectively stand, may be sunken a bit below the top surface of said base member to determine arch position. To strengthen said lower mold section 16, it may have integral with its base and walls, the triangular-prismatic block 31 which fits under the arch 25. There preferably is a recess 32 in the underside of the base 22, to give access to the pins 28, to eject the arch 25.

During set up, and while working on any part of exposed bridgework in the flask 15, it is desirable that any clamp not in use shall be separated from the device, to be out of the way. Hence, in the embodiment shown, the clamps 26, 26' are removable because their hinge pins 33, 33' are free to leave the notches 34, 34' respectively which are in the angularly related bosses 35, 35' extending forwardly from the front surface of the front wall 23 of the lower mold section 16.

During set up, and while filling the counter molds 17, 17' with artificial stone, and while working on the impression 36 to trim the same, it is desirable to detach one or both of said counter molds as may be required. Hence, they are made separable from their hinge pins 37 and 37' respectively. For this purpose, each counter mold has a hook whose bight releasably fits and engages its intended hinge pin. Extending from the rear surface of the rear wall of the lower mold section 16, there extends the central boss 38 which is intermediate and spaced from the bosses 39, 39', to serve to anchor said angularly-related hinge pins 37, 37' respectively. The hook's bight 40 on the right counter mold 17, is for fitted releasable engagement with the hinge pin 37. The hook's bight 40' on the left counter mold 17', is for fitted releasable engagement with the hinge pin 37'. These hooks extend downwardly from the flanges 41, 41' of the respective counter molds. When said counter molds 17. 17' are down over the lower mold section 16, the lugs 42, 42' on them respectively come over the lugs or bosses 35, 35' with some space therebetween as shown at 43.

Each of the upper edges 23', 24' of the respective walls 23, 24, is of a suitable arch form, which in the embodiment herein is shown arcual, as the upper half of a circle. The flange edges 44, 45 of the counter mold 17, conform respectively to the right halves of the perimetral edges of said walls 23, 24, and the flange edge 44' 45' of the counter mold 17', conform respectively to the left halves of the perimetral edges of said walls. Here, also, the hinge pins 37, 37', which diverge downwardly, each make an angle of forty-five degrees with the median vertical plane across the walls 23, 24, and so do the lines along the channel notches 34, 34' respectively.

To use the flask 15, investment material 19 in soft form, is spread over the removable arch 25 and the bridge 20, positioned with its incisal line near the front wall 23, is invested in said material which is allowed to set. Then a separating material is applied to the hardened investment. The counter molds 17, 17' are now filed with soft investment material and brought down and positioned on the lower mold section 16, whereby the impressions 36 and 36' are made. The excess soft material is discharged from the dental flask 15, through the vent holes 46, 46' in the counter molds. After hardening of the investment, the flask members are disassembled and the wax facings flushed out with hot water. Acrylic material in plastic form is applied on the exterior or labial and buccal surfaces of the crowns. Wet cellophane paper is then applied over the acrylic material and the counter molds 17, 17' are then brought down on the cellophane. Pressure is applied to close the flask by use of the clamps 26, 26'. While the acrylic is still in a plastic state, the counter molds and cellophane are removed and all flash, meaning excess material is cut away. The incisal (⅓) portion of the facings are trimmed and incisal blending plastic is applied to the trimmed portions of the facings. Cellophane is again placed over the bridge work and the upper molds 17, 17' are brought down again, positioned and clamped to the lower mold section 16. The excess blending material will be forced off the incisal edges of the facings rather than allowing it to spread and back up onto the body shades.

It is evident that the bridgework may be in separate segments to be dealt with independently by the respective upper mold members, either of which may be manipulated without disturbing the other.

Although in the preferred embodiment set forth herein, the number of upper molds is two, it is readily understandable to those versed in the art without further illustration, that there may be more than two upper flask members, each to span a different part of the lower flask member and independently manipulatable, with closing action as herein taught whereby the excess blending material will be forced off the incisal edges.

It is suggested that the flask members may be cast aluminum and the clamps of brass.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

We claim:

1. In a dental molding flask adapted for forming extensive units of plastic or acrylic bridgework, a lower flask member comprising a base and first and second directly opposite, spaced walls extending upwardly from said base; the space between said walls being adapted to have moldable material therein supporting bridgework in a direction along said walls, a plurality of separate upper flask members positioned to hold moldable material against and along different portions of the bridgework respectively; each of said upper flask members spanning said walls and pivotally mounted on the lower flask member whereby each of said upper flask members is swingable upwardly to be away from over the space between said walls whereupon when so swung, is further away from the first wall than from the second wall, and then is swingable downwardly to again span said walls; the axes of swing of predetermined upper flask members, diverging downwardly and means for releasably securing said upper flask members to the lower flask member.

2. A dental molding flask as defined in claim 1, wherein each of the upper flask members is pivotally mounted on the second wall.

3. A dental molding flask as defined in claim 1, wherein each of the upper flask members is independently swingable and wherein said securing means are plural in number, one for each of said upper flask members and independently operable with respect to its related upper flask member.

4. A dental molding flask as defined in claim 3 wherein each of said securing means is a clamp which is removable from the molding flask.

5. A dental molding flask as defined in claim 1, wherein each of the upper flask members is independently removable from the lower flask member.

6. A dental molding flask as defined in claim 5, wherein the upper flask members are different in structure in such manner that none can occupy the position of any other of them on the lower flask member.

7. A dental molding flask as defined in claim 5, wherein the upper flask members are two in number and different in structure so that one is right and the other is left whereby neither of them can occupy the position of the other on the lower flask member.

8. A dental molding flask as defined in claim 5, wherein said securing means are plural in number and separate, one of each of said upper flask members, and each comprising a clamp which is removable from the molding flask.

9. A dental molding flask as defined in claim 1 including an arch positioned along and fully across the space between said walls, for supporting moldable material which supports the bridgework.

10. A dental molding flask as defined in claim 9, wherein said arch is a separate piece which is removable from the lower flask member.

11. A dental molding flask as defined in claim 10, wherein the base has a recess in its undersurface and a hole therethrough communicative with said recess; said arch having a downward pin which is entered loose into said hole and recess when the arch is mounted on the lower flask member between said walls.

12. A dental molding flask as defined in claim 1, wherein the number of upper flask members is two.

13. A dental molding flask as defined in claim 1, wherein the number of upper flask members is two; each of said upper flask members when in lowered position being across half of the space between the walls and wherein the axes of swing of said upper flask members are substantially perpendicular to each other and at an angle of forty-five degrees with the vertical respectively.

References Cited by the Examiner
UNITED STATES PATENTS

| | | | |
|---|---|---|---|
| 715,182 | 12/02 | Waegel | 18—33 |
| 1,617,829 | 2/27 | Whellock | 18—18 |
| 2,557,558 | 6/51 | Opotow | 18—33 |
| 2,660,758 | 12/53 | Hennike et al. | 18—33 |
| 2,896,259 | 7/59 | Harris | 18—33 |
| 3,058,155 | 10/62 | Harris | 18—33 |

WILLIAM J. STEPHENSON, *Primary Examiner.*